United States Patent
Gaiotti et al.

(10) Patent No.: US 10,933,561 B2
(45) Date of Patent: Mar. 2, 2021

(54) PREFORM FOR CONTAINER MADE OF PLASTIC MATERIAL

(71) Applicant: S.I.P.A. SOCIETA' INDUSTRIALIZZAZIONE PROGETTAZIONE E AUTOMAZIONE S.P.A., Vittorio Veneto (IT)

(72) Inventors: David Gaiotti, Susegana (IT); Laurent Sigler, Boust (FR); Dino Enrico Zanette, Godega di Sant'urbano (IT); Matteo Zoppas, Conegliano (IT)

(73) Assignee: S.I.P.A. SOCIETA' INDUSTRIALIZZAZIONE PROGETTAZION E AUTOMAZIONE S.P.A., Vittorio Veneto (IT)

( * ) Notice: Subject to any disclaimer, the term of this patent is extended or adjusted under 35 U.S.C. 154(b) by 0 days.

(21) Appl. No.: 14/916,777

(22) PCT Filed: Sep. 5, 2014

(86) PCT No.: PCT/EP2014/068944
§ 371 (c)(1),
(2) Date: Mar. 4, 2016

(87) PCT Pub. No.: WO2015/032897
PCT Pub. Date: Mar. 12, 2015

(65) Prior Publication Data
US 2016/0193750 A1   Jul. 7, 2016

(30) Foreign Application Priority Data
Sep. 5, 2013 (IT) .......................... RM2013A000493

(51) Int. Cl.
*B29B 11/14* (2006.01)
*B29C 49/42* (2006.01)
(Continued)

(52) U.S. Cl.
CPC .............. *B29B 11/14* (2013.01); *B29C 49/42* (2013.01); *B29B 11/08* (2013.01);
(Continued)

(58) Field of Classification Search
CPC ......... B29B 11/06; B29B 11/08; B29B 11/14; B29B 2911/143; B29B 2911/14633; B29B 2911/1498
(Continued)

(56) References Cited

U.S. PATENT DOCUMENTS

| 5,888,598 A * | 3/1999 | Brewster | B29C 49/0005 264/513 |
| 8,857,637 B2 * | 10/2014 | Darr | B29B 11/08 215/44 |
| 2005/0048235 A1 | 3/2005 | Dygert et al. | |

FOREIGN PATENT DOCUMENTS

| JP | 2003-053823 | * | 2/2003 | ......... B29C 49/0073 |
| WO | 2012/065162 | | 5/2012 | |

OTHER PUBLICATIONS

"Cylindrical". Merriam-Webster.com. 2018. https://www.merriam-webster.com/dictionary/cylindrical (Year: 2018).*
(Continued)

*Primary Examiner* — Lee E Sanderson
*Assistant Examiner* — Michael C Romanowski
(74) *Attorney, Agent, or Firm* — Abelman, Frayne & Schwab; Stefan Knirr

(57) ABSTRACT

The part under the neck ring (9) of a preform for blowing a PET bottle of predetermined capacity not larger than 75 cl and with a max. material weight of 15 g, is inclined by an
(Continued)

angle α less accentuated than normal, max. 17°, which allows to make a preform with a thickness $t_2$ of the wall thinner than 1.9 mm and a thinner inner diameter of the preform body in order to allow a lower stretch ratio starting from a larger preform to obtain the final bottle of predetermined capacity.

3 Claims, 2 Drawing Sheets

(51) Int. Cl.
  *B29K 67/00* (2006.01)
  *B29B 11/08* (2006.01)
  *B29C 49/08* (2006.01)
  *B29C 49/06* (2006.01)
  *B29L 23/00* (2006.01)

(52) U.S. Cl.
  CPC ............... *B29B 2911/14013* (2013.01); *B29B 2911/1482* (2013.01); *B29B 2911/1498* (2013.01); *B29B 2911/14337* (2015.05); *B29B 2911/14341* (2015.05); *B29B 2911/14366* (2013.01); *B29B 2911/14633* (2013.01); *B29B 2911/14753* (2013.01); *B29C 49/06* (2013.01); *B29C 49/08* (2013.01); *B29K 2067/003* (2013.01); *B29L 2023/00* (2013.01)

(58) Field of Classification Search
  USPC .......................... 428/36, 36.92, 35.7, 36.91
  See application file for complete search history.

(56) References Cited

OTHER PUBLICATIONS

International Search Report and Written Opinion dated Feb. 2, 2015 for corresponding PCT patent application No. PCT/EP2014/068944.

International Preliminary Report on Patentability dated Sep. 15, 2015 for corresponding PCT patent application No. PCT/EP2014/068944.

* cited by examiner

PREFORM FOR CONTAINER MADE OF PLASTIC MATERIAL

CROSS REFERENCE TO RELATED APPLICATIONS

This application is a national phase of PCT application No. PCT/IB2014/068944, filed Sep. 5, 2014, which claims priority to IT patent application No. RM2013A000493, filed Sep. 5, 2013, all of which are incorporated herein by reference thereto.

FIELD OF THE INVENTION

The present invention relates to a preform made of plastic material, such as PET or other suitable material, e.g. used to make a small-sized container for beverages by blow molding.

STATE OF THE ART

For reasons of cost-effectiveness, the line of conduct followed by PET container manufacturers is to reduce weight, and thus the amount of resin used, as much as possible, while maintaining the technical features of the containers themselves, which are mainly disposable, at the same time. Naturally, increasingly lighter preforms (intermediate semifinished products), the weight of which must correspond to that of the final blown container, are made in order to do this.

Particular attention is devoted by designers to the performance of the small-sized containers, i.e. of small size, e.g. of bottles of capacity of less than one liter, in particular of bottles with a capacity from 25 to 100 cL, that is from 0.25 to 1 liter (L) which represent a large slice of the beverage market. In particular, water bottles, with and without the addition of nitrogen, not containing $CO_2$ and having such a size that the final weight of the finished empty container is from 6 to 15 g, display challenges which are difficult to satisfy, having little thermoplastic material which must be stretched to the limit of its structural strength to conform to the various zones forming the container. An indispensable priority in the design of such containers is constituted by the technical performances of this category of blown containers as a whole, which have very thin body walls, such performances including, for example: axial load strength, burst strength, in the cases in which nitrogen is added, and deformation strength in the radial direction.

An appropriate drawing of the final container and of all its details and a careful design of the initial preform from which the container is blown, which must guarantee the correct distribution of the plastic material during blowing, is necessary in order to achieve sufficient design performances with a small amount of thermoplastic material. It is apparent that the design of the preform is also fundamental for the correct result of the final container, in particular for small-sized bottles, since a small amount of material must be distributed in the preform in order to satisfy particular elongation constraints of the material in the various zones. Poor quality of the container or an excessive consumption of material will result if this is not done. This means that for small-sized bottles, i.e. having a volume smaller than 100 cL and weighing less than 16 g, the end-product quality is highly sensitive to design parameters, or combinations of parameters, of the preform, such as distribution of the wall thickness, axial length of specific segments, and angle of taper of specific portions of the wall. For this kind of containers, even small variations of such parameters are crucial. Furthermore, these parameters significantly affect the manufacturing cost, in particular that related to the blowing process.

It is known in PET manufacturing technology that precise ideal size ratios between the geometry of the preform to be blown and the final blown container must be respected for the technical performances of the latter to be top. In particular, there are size ratios which must not be exceeded:

Axial Stretch Ratio (ASR) from 3 to 3.4 (including limit values);

Hoop Stretch Ratio (HSR) from 3.8 to 4.4 (including limit values);

Total Stretch Ratio (TSR) from 11.4 to 15.0 (including limit values), where TSR=ASR×HSR.

Therefore, in order to produce a container with a 50 cL or 75 cL or similar capacity, for water without carbon dioxide, and consequently for which a very thin bottle wall is sufficient to withstand the stresses to which the bottle is subjected, and using the property of PET to be stretched to reach very thin thicknesses with respect to other thermoplastic materials, the amount of PET needed is approximately 6-10 g per bottle. With the constraint of such a small amount of PET, considering that the size of the neck is that of the final container already at the time of injection or injection-compression molding and that the neck is not involved in the stretching of the rest of the body during blowing, necessarily the preform to be made must have a very small, short body with a narrow diameter because of the small amount of material used; moreover, the aforementioned stretch ratios needing to be respected, the material tends to work in the extreme zones of such ranges, with the greater risk of presenting faults of various types in the product, such as overstretching (which causes an opacization of the final product), poor material distribution (with particular, undesired thickening of resin in the zone under the neck ring and in the middle of the bottle bottom) and increase of energy consumption for blowing the preform.

Furthermore, the preform body diameter reduction, which is a consequence of the smaller amount of available material, makes stretching-blowing difficult because the blowing rod cannot be reduced beyond a given diameter to guarantee the sufficient rigidity thereof. Indeed, if the difference between the outer diameter of the rod and the inner diameter of the preform is too small, the preform surface could stick to the rod, causing the rejection of the finished product.

The preform wall under the neck ring should be thinner in order not to decrease the inner diameter, the amount of material being equal, but this solution has technological limits due to the current machines and molds, which, in general, do not allow to inject preforms with a body wall thickness of less than 2 mm.

Indeed, traditional PET injection technology allows to obtain the following size ratios for preforms (extreme values):

a) L/t<45 when L<100 mm, b) L/t<50 when L is greater than or equal to 100 mm, where L is the total length of the preform in mm and t is the thickness of the preform in mm.

Attempting to obtain a preform wall thickness thinner than 2 mm with injection is particularly difficult because of the high friction forces which are developed and oppose the flow of the PET itself within the injection mold cavity.

In order to overcome these friction forces, within given limits, some typical parameters of the process must be adjusted, and typically:

increasing, within given limits, the temperature of the molten PET to decrease viscosity. However, this implies, as disadvantages, a greater plastic material decay, producing acetaldehyde which gives a bad taste to the water contained in the bottle; a longer cooling time, which increases the time cycle and decreases machine productivity; a greater tendency to form flashes and to highlight parting lines;

increasing the injection pressure, but this implies, from a mechanical point of view, an increase of all the forces in play, including the press bed closing forces, with consequent increase of wear and mechanical failures of both the mold and the machine. From a product point of view, there is an increase of the tendency to form flashes and to highlight the parting lines Finally, from a chemical point of view, there is a considerable, highly undesirable increase of the formation of acetaldehyde, the presence of which will also be found in the final container.

Not less important in this type of industry is the continual search for a better energy balance of the container production cycle, but working with preforms of such small sizes entails working with higher stretch ratios in the passage from preform to final container and implies a higher energy consumption.

It is thus felt the need to make an innovative preform which allows to overcome the aforesaid drawbacks.

SUMMARY OF THE INVENTION

It is the main object of the present invention to provide a preform made of plastic material, for making a container, in particular a small-sized PET bottle by means of blowing or stretching-blowing, having a geometry such as to guarantee an optimal blowing of a high-quality container with a lower unitary energy use.

Another not less important object of the invention is to obtain a preform which is made lighter in optimal manner for manufacturing by means of injection-compression molds instead of injection molds.

The present invention thus reaches the aforesaid objects by making a preform made of PET adapted to produce a bottle having a final volume not higher than 1 l and weighing less than 16 g by means of a stretching-blowing operation, defining a longitudinal axis and provided at a first end thereof with a cylindrical neck defining the following parts in sequence:
  a threaded end portion for screwing a cap,
  a neck ring, under said threaded end portion,
  a first cylindrical connection segment having a first predetermined outer diameter and a wall of thickness t1 substantially equal to the thickness of the blown bottle in the same zone,
  a preform body, intended to be heated before the blowing operation, defining in turn the following parts:
  a second connection segment with outer wall tapered by a first angle with respect to the longitudinal axis and with inner wall tapered by a second angle with respect to the longitudinal axis, and having a predetermined length $H_3$ projected on the longitudinal axis,
  a cylindrical segment having a second outer diameter smaller than said first outer diameter and a second predetermined thickness $t_2$ greater than the first thickness $t_1$,
  a bottom which closes a second end of the preform,
characterized in that
  the second thickness $t_2$ is not thicker than 1.9 mm,
  the first angle is from 6 to 17°,
  the second angle is from 9 to 21°,
  the length $H_3$ is from 10 to 20 mm.

Advantageously and with respect to the known preforms, the geometry of the preform of the invention, determined by an innovative combination of particular size parameters, allows to obtain:
  a further reduction of the total weight of the final container from 5 to 10 grams for bottles, which with the know techniques weigh from 10 to 20 g, while maintaining adequate mechanical properties equal to those of the prior art;
  a wider blowing process window, i.e. a wider parameter variability range to obtain good bottle results with less influence of optimal design process variations;
  lower risks of interference or contact between the stretching rod and the inside of the preform body;
  a greater molding machine efficiency due to the lower temperatures to which the preform must be taken before blow molding;
  a better final container quality, by considerably reducing pearlescence and parting lines;
  lower energy consumption for producing the containers.

The dependent claims describe preferred embodiments of the invention.

BRIEF DESCRIPTION OF THE DRAWINGS

Further features and advantages of the invention will be more apparent in the light of the detailed description of a preferred, but not exclusive embodiment, of a preform made of plastic material shown by way of non-limitative example, with reference to the accompanying drawings, in which.

The same reference numbers in the figures identify the same elements.

DETAILED DESCRIPTION OF A PREFERRED EMBODIMENT OF THE INVENTION

Figure 1:
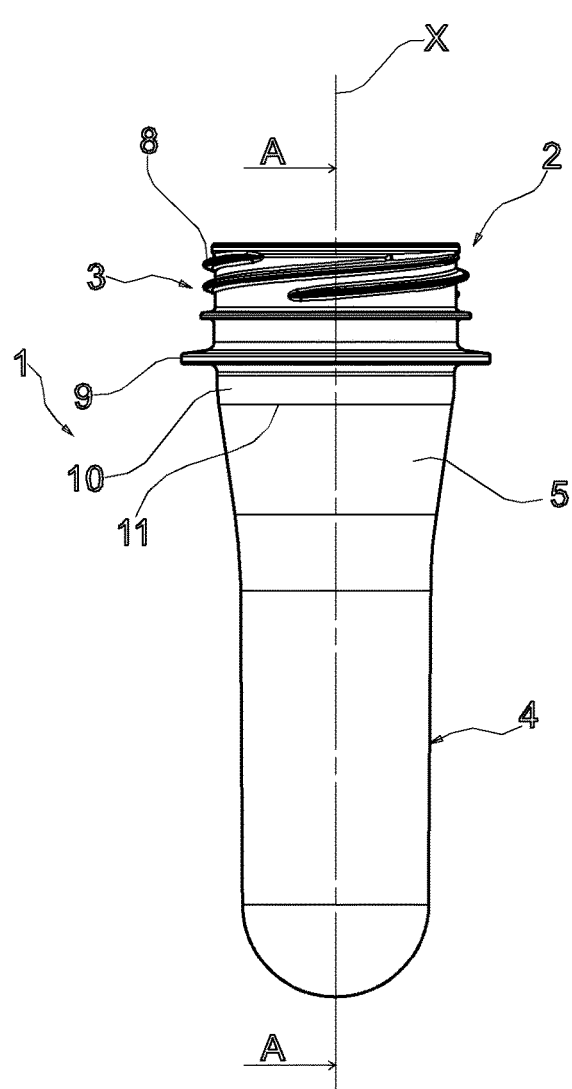
FIG. 1 is a side view of a preform according to the present invention.
Figure 2:
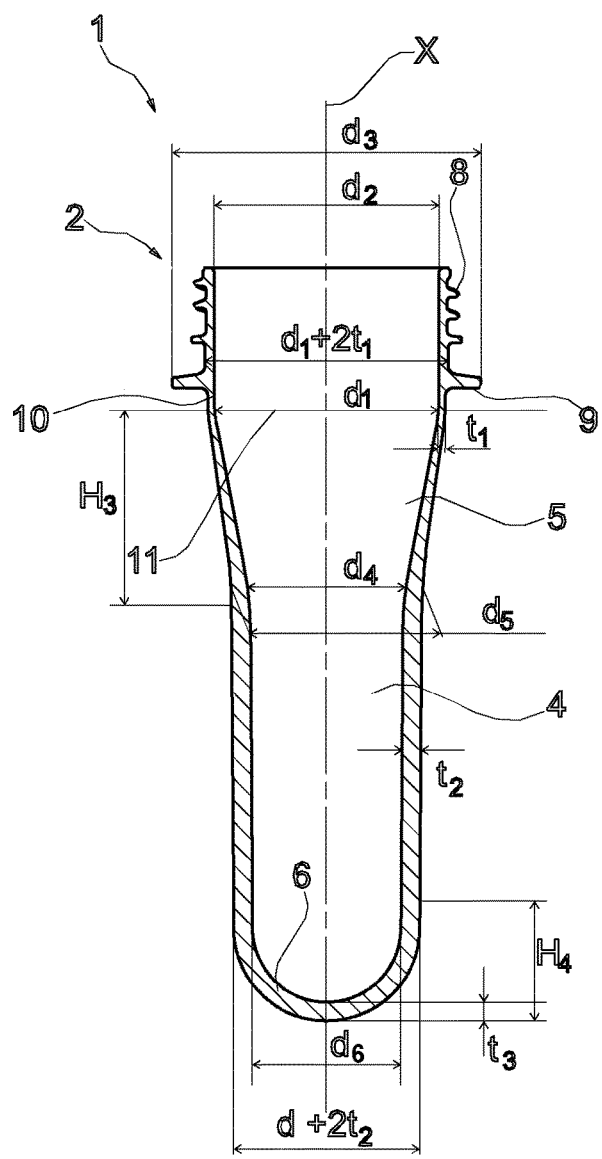
FIG. 2 is a cross section of the preform in FIG. 1.

A first embodiment of a preform made of thermoplastic material, indicated as a whole by reference numeral 1, is shown with reference to the drawings. Hereinafter, reference is made to "up" and "down" and to "upper" and "lower" only with reference to the arrangement of the preform shown in the drawings, for the sake of better understanding of the invention, but without limiting the invention at all.

The preform 1, e.g. made of PET (polyethylene terephthalate) or any other suitable thermoplastic material with features similar to PET, defines a longitudinal axis X and comprises a neck 2, which ends on top with a tubular cylindrical portion 3, which is suited to be sealed by a threaded closing cap, which, as generally known, consists of a closing cap itself and a tamper evident ring which is connected to the cap by means of a series of precut connection joints. The function of such joints is to guarantee the complete sealing of the cap and the absence of possible tampering of the bottle cap.

The cylindrical tubular segment 3 comprises a threaded end portion 8, onto which the threaded cap is screwed, and an annular ridge or neck ring 9, which, as well known to the person skilled in the art, has the function of guaranteeing holding and resting for handling with appropriate means, e.g. grippers, widely known to the person skilled in the art in themselves. The neck ring 9 is further shaped so as to be able to slide on longitudinal guides which support the neck of the bottle on both sides for supporting and retaining the bottle while it advances downstream of the container production system.

The thread of the threaded end portion 8 starts at a predetermined distance from the open end of the neck 2 so as to allow to insert the end edge of the neck into the annular seat provided in the closing cap to ensure an optimal sealing with the release or introduction of fluid.

A cylindrical portion 10 is arranged under the neck ring 9, the function of which is to mate with the thickness of the blowing mold in the upper part and of cooperating with the annular ridge 9 leaving a gap to allow the bottle also to slide on the longitudinal advancement and conveying guides, which may be located downstream of the container manufacturing system, after blowing.

More in detail, this cylindrical portion 10 is comprised between the neck ring 9 and the plane of the connection section 11 with the transition segment 5, which is substantially truncated cone shaped.

The height of the cylindrical portion 10, measured between the lower face of the neck ring 9 and the plane of the connection section 11, is greater than the thickness of the upper wall of the blowing mold and of the thickness of the conveying guides used in the system. The inner diameter $d_1$ of the cylindrical portion 10 is either smaller than or equal to the inner diameter $d_2$ of the threaded end portion 8.

The neck 2, the neck ring 9 and the cylindrical segment 10 are parts of the preform which assume their final size, corresponding to that of the final bottle, already at the outlet of the preform injection mold and do not vary their sizes and their shape during blowing. In this manner, the possibility of handling the preform is guaranteed also when the lower part of the cylindrical segment 10 near the plane of connection section 11 is heated and softened.

In the zone of the cylindrical segment 10, the preform has a boundary zone between the body which must be heated to design temperature to allow the blowing of the container and the upper part of the neck ring 2 where the temperature remains approximately equal to ambient temperature. During the blowing operation, the preform body under the cylindrical part 10 is deformed by effect of the high pressure air, which may reach approximately 40 bar, which deforms the preform body substantially starting from the line 11 to the lower end of the preform, thus making the wall of the body 4 of the preform long and thin until the shape of the container or bottle, whichever, is assumed. In this blowing operation, the presence of this cylindrical segment 10 ensures that the heat is not transmitted in considerable manner to the neck ring and neck, which must remain as rigid as possible and must allow the preform wall to conform to the upper wall of the blowing mold which envelops the preform under the neck ring, making it perform a hinge-like movement which goes from the position shown in figures from 1 to 3 to the final shape of the bottle with the zone of the body 4 expanded to a diameter which is much larger than the diameter of the neck 2. The thickness of the wall of the cylindrical part 10 neither diminishes nor elongates considerably because care is devoted to preventing the temperature of such a cylindrical part from rising beyond a determined level at which rigidity of the neck is compromised.

In particular, the connection section 11 is positioned on the circular line which delimits the transition segment 5 and the lower end of the tubular cylindrical segment 3, having an outer diameter $(d_1+2t_1)$, where $t_1$ is the thickness of the cylindrical portion 10 which is evidently determined geometrically by having fixed the values of $t_2$, of the alpha angle, of the beta angle and of $H_3$. Said transition segment 5 extends downwards with an inner and outer diameter gradually decreasing with respect to the inner diameter $d_1$ and the outer diameter $(d_1+2t_1)$ of the annular portion 10, respectively. At the lower end thereof, the transition segment 5 has an inner diameter $d_4$ and an outer diameter $d_5$.

Figure 3:
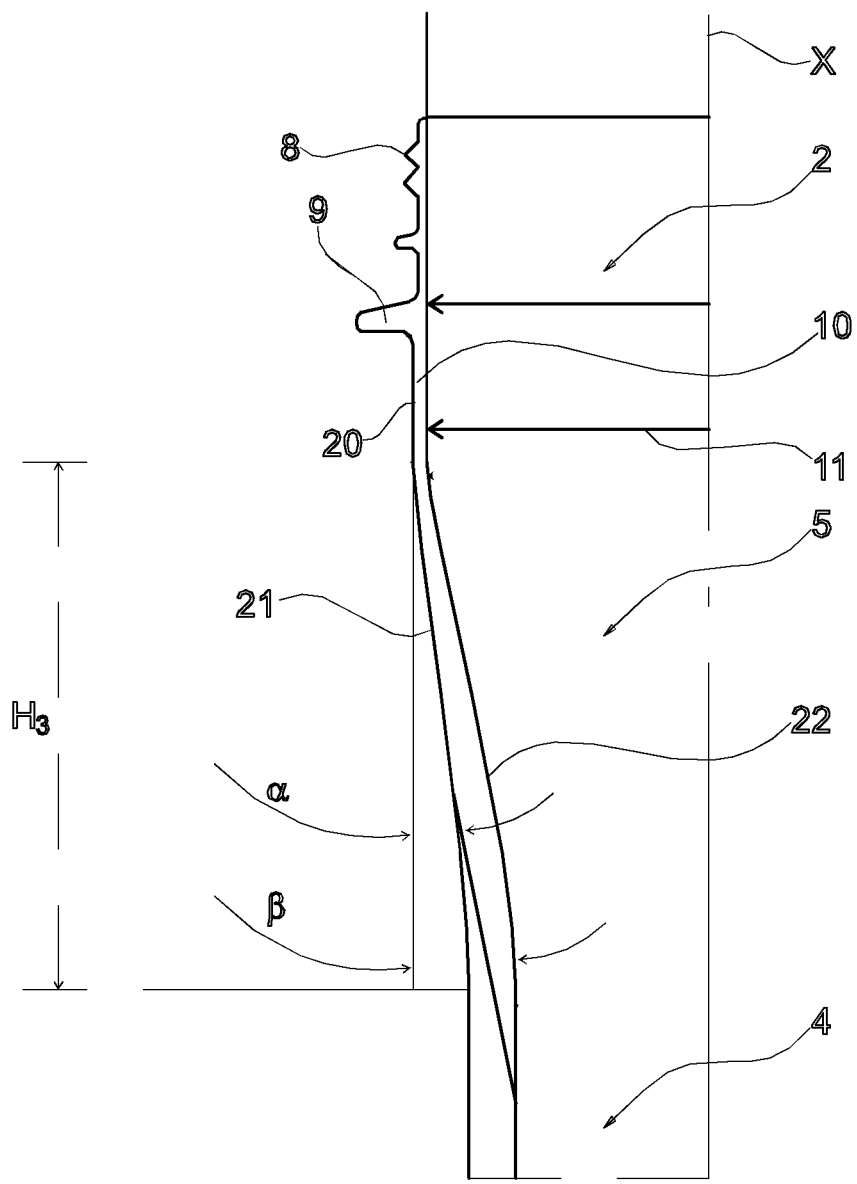
FIG. 3 is an enlargement of part in the section in FIG. 2.

As stated above, for small-sized bottles, a careful selection of the preform design parameter is crucial in order to achieve a good quality end-product, i.e. the bottle. Advantageously, the features that the preform must have in order to guarantee optimal blowing will now be described with reference to the cross section in FIG. 3:

the angle α defined on a section plane containing the axis X between the outer surface 21 of the transition segment 5 and the extension 20 of the outer surface of the annular portion 10 is from 6 to 17°, the angle β defined on said section plane, between the inner surface 22 of the transition segment 5 and the extension 20 of the outer surface of the annular portion 10 is from 9 to 21°, the length $H_3$ along the axis X of the transition segment 5 is comprised between 10 and 20 mm.

Even more advantageous is a preform with the following size:
the second thickness $t_2$ is from 1.2 to 1.9 mm, the first angle (α) is from 6° to 13.5°, the second angle (β) is from 9° to 16°, the length $H_3$ is from 14 to 20 mm.

And even more advantageous is a preform with the following size: the second thickness $t_2$ is from 1.4 to 17 mm, the first angle (α) is from 6° to 10°, the second angle (β) is from 9° to 13°, the length $H_3$ is from 14 to 18.5 mm.

The particular choice of these two angles α and β and of length $H_3$ has been found to be advantageous, in particular for small-sized bottles, because it allows to obtain a more effective heating with a better material distribution. Indeed, these angles being less inclined than the symmetry axis X of the preform, the heating lamps (not shown, but well known to the person skilled in the art), which are arranged along the side of the preform 2 in the zone under the neck ring 9, are closer to the surface of the preform than the preforms of the prior art, which have the part of the body under the neck ring more tapered, and thus more distant from the lamps, instead. Otherwise, the power of the heating lamps would need to be increased, with a greater waste of energy, in order to obtain a heating of the preform which takes the body to an equal temperature. Thus, the chosen shape of the zone under the neck ring 5 of the preform body in this invention allows to reduce the power of the heating lamps, in particular of the lamp closest to the neck ring, with less risk of transmitting excessive heat to the cylindrical zone 10 and to the neck ring 9, which must remain as rigid as possible. It has indeed been found that an energy saving of 20% can be saved in the heating operation of the preform 2 with a tapering of the zone 5 of the body chosen for the invention.

A further advantage is that the thickness $t_2$ of the preform body 4 is either lower than or equal to 1.9 mm, preferably from 1.4 to 1.9 mm. The choice of this thickness $t_2$ has been found to be advantageous because it guarantees stretch ratios within the required range.

More in detail, the preform body 4 is comprised between the line, distal from the neck ring 9, where the connection segment 5 terminates, and the line, proximal to the neck ring 9, where the bottom 6 terminates. The thickness $t_2$ of the wall of the preform body 4 is constant and also the maximum thickness, in particular as compared to the thickness at the end, distal from the neck ring 9, of the connection segment 5, which tapers downwards.

The thickness of the body wall of the preform 2 lower than 1.9 mm, which allows to make the size described above for the other parts of the preform body (difficult to achieve with the conventional injection molds), is today obtained by means of injection compression systems and by means of injection molds which are coated with one or more nano-layers of alloys, for example, using the technology known as atomic-layer deposition (ALD), which reduces the sticking of the PET to the wall of the mold and thus allows to reach these wall thinness values.

The length $H_4$ of the bottom 6 of the body 4 of the preform 2 measured along axis X necessarily derives from the amount of material used for the preform,—which, in turn, is necessarily defined according to the design of the finished container which is necessary to obtain. The thickness in the zone of the bottom 6 is preferably equal to the thickness $t_2$, while an inner diameter $d_6$ which is slightly smaller than the inner diameter $d_4$ of the lower end of the transition segment 5, and an outer diameter $d_5+2t_2$, which is slightly smaller than outer diameter $d_5$ of the lower end of the transition segment 5, are chosen.

Choosing a preform according to the invention also guarantees energy saving in the blowing cycle for the reasons explained here. By working with a preform with larger body size, length and diameter, the material weight being equal, allows to blow with smaller stretch ratios while remaining within the aforementioned feasible ranges for PET. Smaller stretch ratios allow the preform body walls to reach the inner wall of the blowing mold more rapidly with less cooling of the material and greater stability. The wall of the final bottle is thus thinner, the heating energy used being equal also in zones which cool down rapidly, i.e. in the sprue zone or the zone in the middle of the bottle mold bottom, which generally displays an unnecessary accumulation of PET in the bottles of the prior art. This advantage may lead to a use of less material to obtain a bottle of the same size and with the same structural features, corresponding to a material saving which may reach 10%. If necessary, it is possible to save even more than 30% of material, by taking a slight decay of the structural features of the final container into account. Working with lower stretch ratios and with thinner preform walls also implies using a lower pressure in the secondary blowing stage, which instead of being from 26 to 32 bar is from 16 to 20 bar in the case of the preform according to the invention.

The use of more powerful lamps would tend to heat the zone of the cylindrical part 10 furthermost from the neck ring 9 creating a zone under the neck ring in which the material is colder, and thus there is a greater stagnation of material, which translates into a worse distribution of the material along the mold wall also in the shoulder part of the bottle. Too much material remaining in the zone under the neck ring causes the disadvantage that less material is distributed along the bottle mold bottom profile making it too thin and not very suitable for withstanding the weight of the bottle alone, and even more of withstanding the weight of bottles stacked on various levels. Instead, the use of less powerful heating lamps in the zone of the cylindrical part 10 also has the advantage that this zone is heated better, thus achieving a better plasticization in the zone of the plane of the connection section 11, improving the blowing result and obtaining a better material distribution also in the zones of the bottle arranged furthermost from the neck.

Another contribution to energy saving is that the stretching rod is inserted in a larger diameter preform body, and thus there is less risk of producing an interference with the inner wall of the preform with possible sticking, which increase faulty product rejects.

The invention claimed is:

1. A preform made of plastic material for producing a PET bottle having a volume smaller than 1 L and weighing less than 16 g by means of a stretching-blowing operation, said preform defining a longitudinal axis (X) and provided at a first end thereof with a cylindrical neck (3) and defining the following parts in sequence:
   a threaded end portion (8) for screwing a cap,
   a neck ring (9) under said threaded end portion (8),
   a first cylindrical connection segment (10) having a first predetermined constant outer diameter and a wall having a first constant thickness ($t_1$) substantially equal to the thickness of the wall of the PET bottle in the first cylindrical connection segment,
   a preform body, intended to be heated before the blowing operation, defining in turn the following parts:
   a second connection segment (5) with outer wall (21) tapered by a first angle (α) with respect to the longitudinal axis (X) and with inner wall (22) tapered by a second angle (β) with respect to the longitudinal axis (X), and having a predetermined length ($H_3$) on the longitudinal axis (X),
   a cylindrical segment (4) having a constant second outer diameter smaller than said first outer diameter and a constant second thickness ($t_2$) greater than the first thickness ($t_1$),
   a bottom (6) which closes a second end of the preform (2),
   wherein the first angle (α) is from 6° to 17°,
characterized in that
   the second thickness ($t_2$) is from 1.4 to 1.7 mm,
   the second angle (β) is from 9 to 21°,
   the length ($H_3$) is from 10 to 20 mm.

2. The preform according to claim 1, having a total weight from 5 to 10 g.

3. The preform according to claim 1 for producing a PET bottle by means of a stretching-blowing operation using a one-step blowing method with a single blowing mold being used to form a final shape of the PET bottle.

* * * * *